June 12, 1956            E. A. FERRIS            2,750,019
ONE-WAY ENGAGING DEVICE
Filed Dec. 22, 1950            3 Sheets-Sheet 1
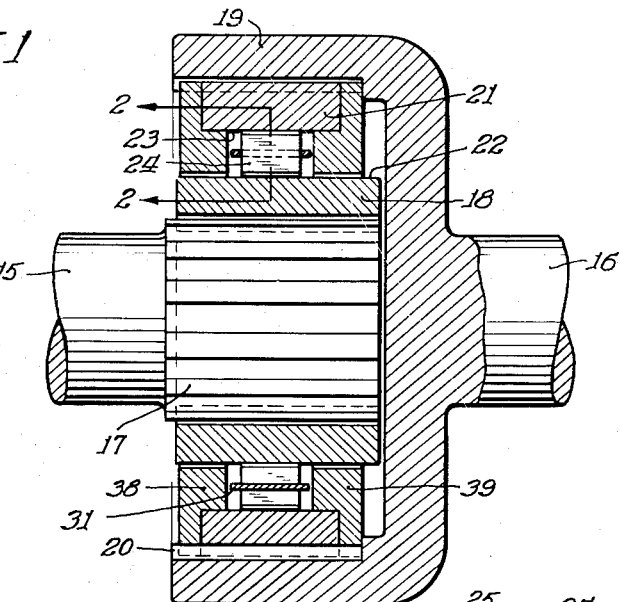
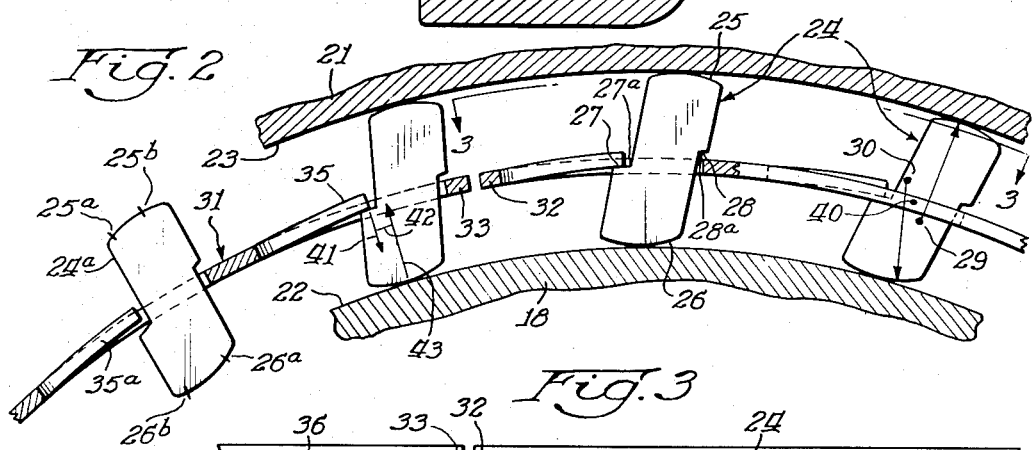
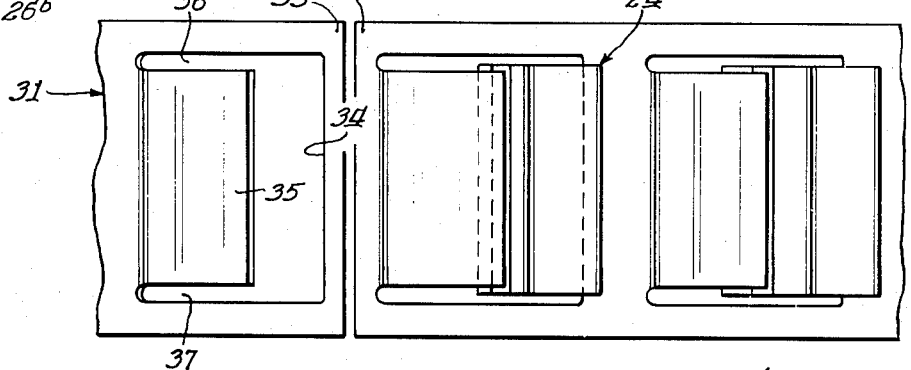
Inventor:
Ernest A. Ferris June 12, 1956 E. A. FERRIS 2,750,019
ONE-WAY ENGAGING DEVICE
Filed Dec. 22, 1950 3 Sheets-Sheet 2
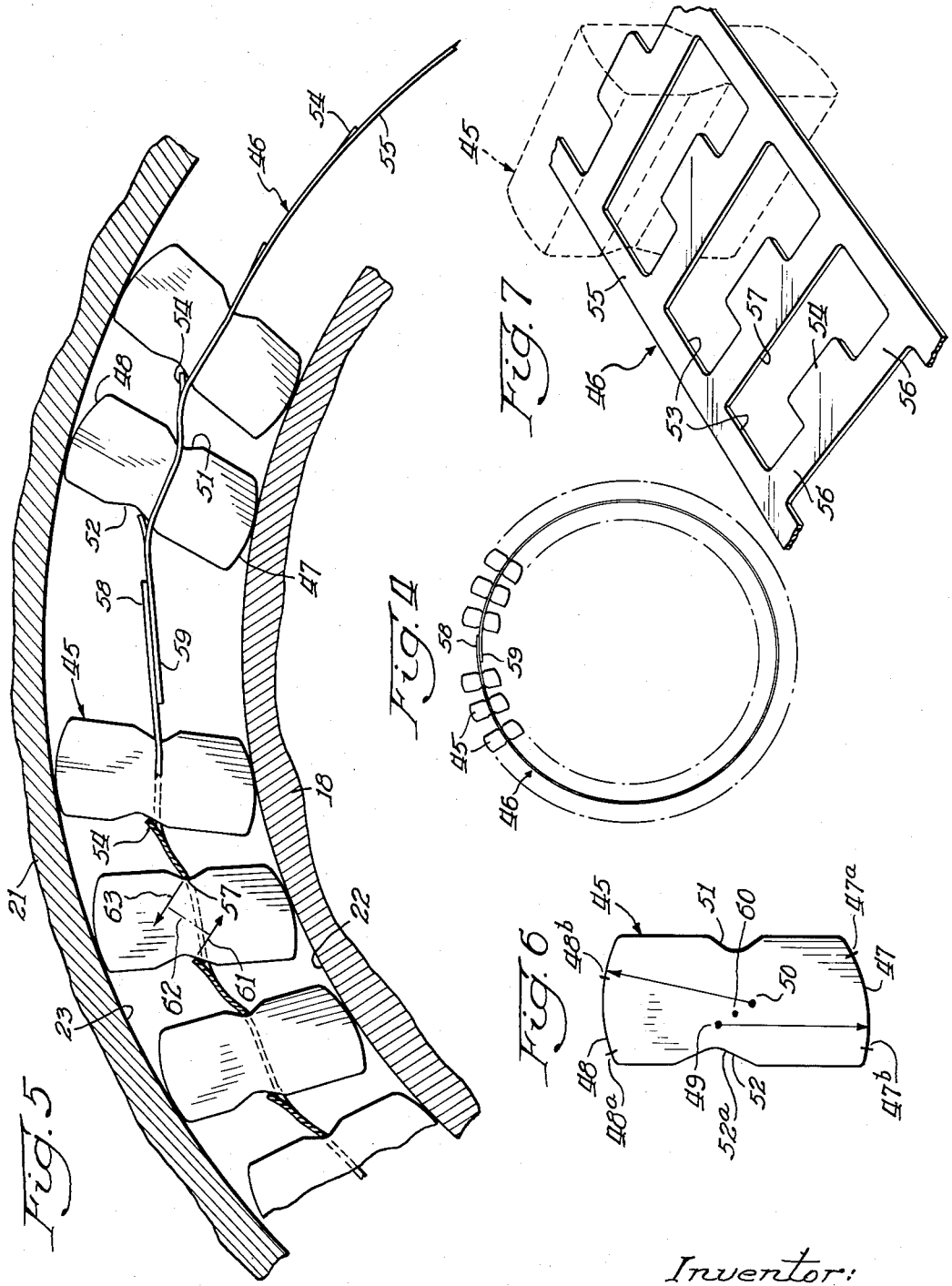
Inventor:
Ernest A. Ferris
By: Edward Dritzkamp June 12, 1956　　　　E. A. FERRIS　　　　2,750,019
ONE-WAY ENGAGING DEVICE
Filed Dec. 22, 1950　　　　　　　　　　　3 Sheets-Sheet 3
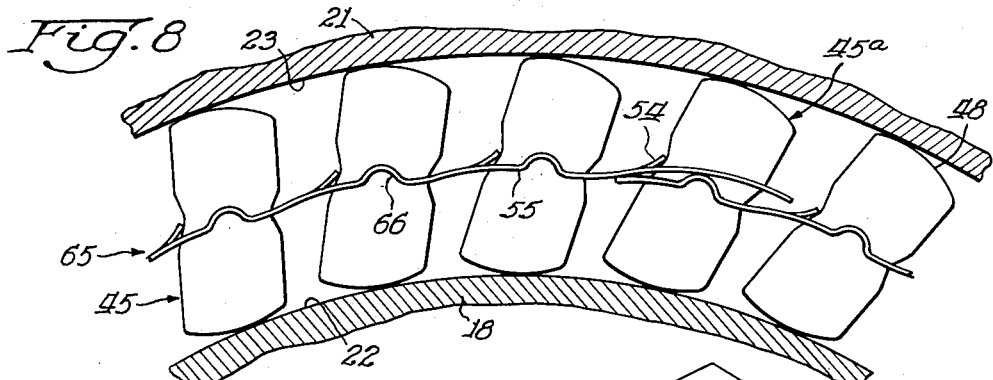
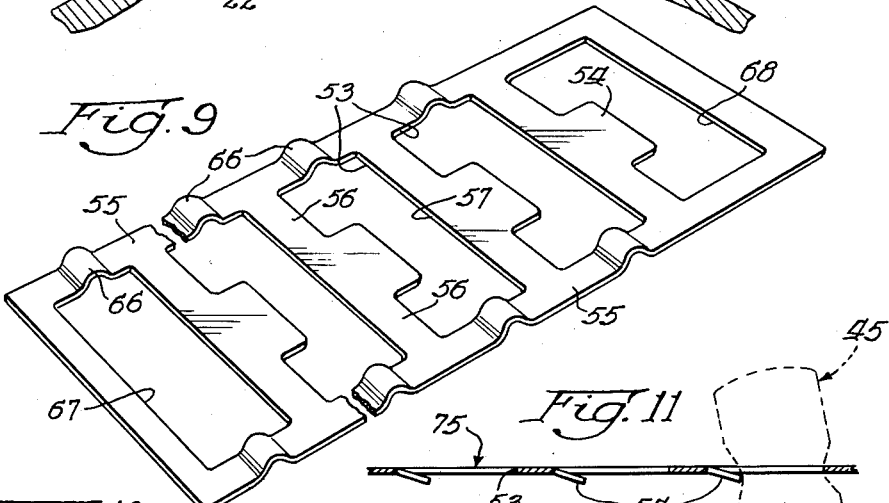
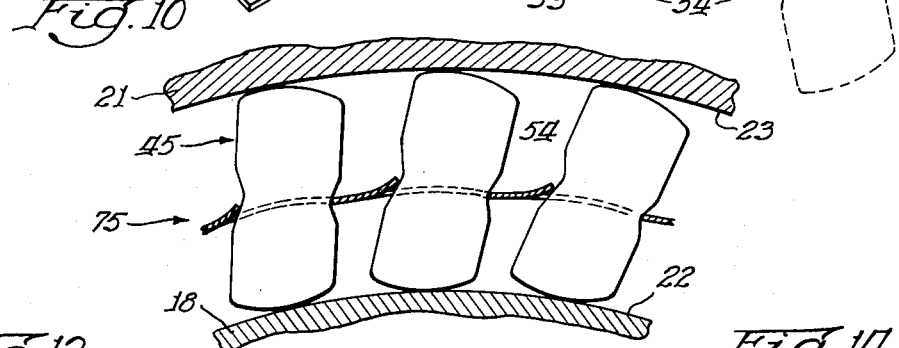
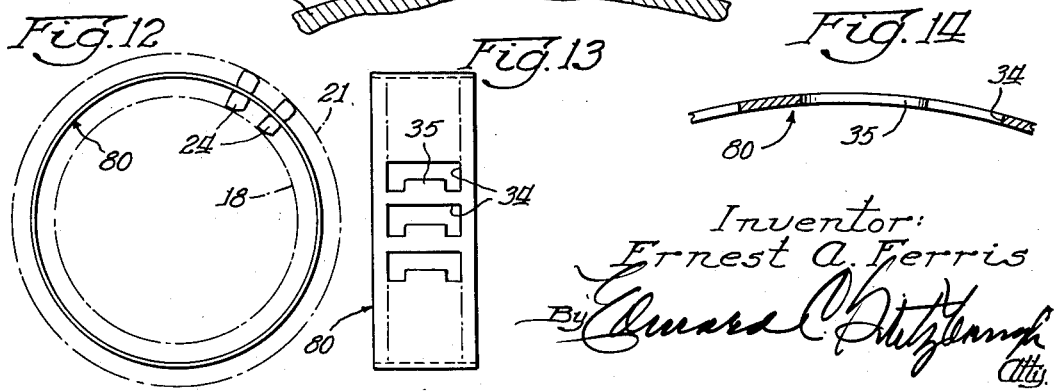
Inventor:
Ernest A. Ferris ID  United States Patent Office 2,750,019
Patented June 12, 1956

2,750,019

ONE-WAY ENGAGING DEVICE

Ernest A. Ferris, Oak Park, Ill., assignor to Borg-Warner Corporation, Chicago, Ill., a corporation of Illinois Application December 22, 1950, Serial No. 202,385

31 Claims. (Cl. 192—45.1)

My invention relates to one-way engaging devices and more particularly to such devices of the type employing tiltable sprags or grippers disposed between opposed races and resilient means for tilting the sprags into engagement with the races.

It is an object of my invention to provide, in a one-way engaging device of this type, improved means for holding the sprags spaced with respect to each other and resiliently urging them into engagement with the races. More particularly, it is an object to provide an improved sprag retainer which in itself performs both of these functions and in addition preferably functions on disassembly of the one-way engaging device to hold the sprags from dropping out of the retainer, so that the retainer and sprags as a unit may be easily assembled between the races.

It is still another object of the invention to provide a unit sprag retainer and spring formed of a ribbon of metal or other spring material and which is quite flexible to allow the assembly of sprags and retainer to be used with races of many different diameters. It is also an object of the invention to provide a sheet metal ribbon type sprag cage and spring which is formed so as to be yieldable longitudinally of the ribbon so that longitudinal stress may be put on the ribbon when assembled with the sprags between the races for causing the sprags to bear with greater pressure on one of the races than on the other. It is also an object of the invention to provide an improved sprag cage and spring unit which is distorted previous to assembly between the races with the sprags for putting more or less tilting force on the individual sprags as desired.

The invention consists of the novel constructions, arrangements and devices to be hereinafter described and claimed for carrying out the above stated objects and such other objects as will be apparent from the following description of preferred embodiments of the invention, illustrated with reference to the accompanying drawings, wherein:

Fig. 1 is a longitudinal, sectional view of a one-way engaging device embodying the principles of the invention;

Fig. 2 is a fragmentary sectional view on an enlarged scale taken on line 2—2 of Fig. 1;

Fig. 3 is a view taken on line 3—3 of Fig. 2;

Fig. 4 is a side view of a unit cage, spring and sprag assembly of a modified form of the invention;

Fig. 5 is a fragmentary sectional view on an enlarged scale of the sprag and cage assembly illustrated in Fig. 4 in assembled relation with inner and outer races;

Fig. 6 is a side view on an enlarged scale of the individual sprags in the Fig. 4 embodiment of the invention;

Fig. 7 is a perspective view of the unit cage and spring of the Fig. 4 form of the invention;

Fig. 8 is a fragmentary sectional view of a one-way engaging device constituting another form of the invention and comprising a unit cage and spring of a different design from those used in the preceding embodiments;

Fig. 9 is a perspective view of the unit cage and spring of the Fig. 8 form of the invention;

Fig. 10 is a fragmentary sectional view of another form of the invention comprising another type of unit cage and spring for a plurality of sprags;

Fig. 11 is a side view of the unit cage and spring of the Fig. 10 embodiment in flat condition disassembled from the rest of the one-way unit;

Fig. 12 is a side view of another form of unit cage and spring constituting another embodiment of the invention;

Fig. 13 is a side view of the unit cage and spring shown in Fig. 12; and

Fig. 14 is a fragmentary sectional view on an enlarged scale of the unit cage and spring of the Fig. 12 embodiment.

Like characters of reference designate like parts in the several views.

Referring now to Figs. 1, 2 and 3 in particular, the illustrated embodiment of one-way engaging device comprises two coaxially disposed shafts 15 and 16. The shaft 15 is formed with splines 17, and an annular inner race 18 is disposed on the shaft 15 in splined relationship with the splines 17. The shaft 16 is formed with a belled portion 19 provided with splines 20 on its inner surface. An outer annular race 21 is disposed in the belled portion 19 in splined relationship with the splines 20. The inner race 18 has an outwardly facing cylindrical race surface 22, and the race 21 has an inwardly facing cylindrical race surface 23 which are spaced and are in opposed faced relationship with each other.

A plurality of tiltable sprags or grippers 24 are disposed between the race surfaces 22 and 23 and are adapted to be tilted to simultaneously grip these two surfaces. The sprags 24 are each provided with oppositely disposed cylindrical race engaging surfaces 25 and 26 and oppositely disposed ledges 27 and 28, the ledge 27 facing toward the surface 25 and the ledge 28 facing toward the surface 26 as shown. The surface 25 has as its center a line passing through the point 29, and the surface 26 has as its center a line passing through the point 30, the lines being parallel and spaced from each other so that as each of the sprags is tilted in a counterclockwise direction as seen in Fig. 2, the cylindrical surfaces 25 and 26 will engage the cylindrical race surfaces 22 and 23.

A sprag cage 31 is provided having the dual function of holding the sprags 24 spaced from each other and also for holding the sprags under spring action in engagement with the race surfaces 22 and 23. The cage 31 is a ribbon or strip having ends 32 and 33 that is of a spring material such as steel, Phosphor bronze, or beryllium copper. The cage is provided with a window or opening 34 therethrough for each of the sprags 24 and a tab or projection 35 formed by slots 36 and 37 extends into each of the windows for engaging with the sprag 24 within the window.

The cage 31 may be formed from a flat strip, and the windows 34 and the slots 36 and 37 may be punched into the strip while in flat condition. The cage is then bent into its cylindrical shape in which it is illustrated, and when the cage and sprags are disassembled with respect to the races 18 and 21, as for example in the condition of the particular sprag 24a shown in Fig. 2, the corresponding tab 35a will extend slightly outwardly with respect to the cage 31 as a whole, since the tabs will not be given the cylindrical set given the cage as a whole. The cage 31 when disassembled from the races 18 and 21 has sufficient stiffness so that it remains in the form in which it is illustrated in Fig. 2, the cage 31 being of a substantial thickness such as .025 to .030 inch thickness of steel, for example, so that it remains in its cylindrical shape. When the sprags 24 and cage 31 are assembled between the races 18 and 21, the sprags are tilted clockwise as seen in Fig. 2, so that the tabs 35 are bent against the spring action of the tabs outwardly from the main body of the cage 31 as is shown in this figure, and the spring action of the tabs 35 tends to tilt the sprags 24 in the counterclockwise direction to wedge them by spring force between the race surfaces 23 and 22.

Annular retainer members 38 and 39 may be provided within the belled portion 19 and in splined relationship with the splines 20 for the purpose of retaining the sprags 24 and the cage 31 in assembled relationship between the inner and outer races 18 and 21.

In operation, the sprags 24 will frictionally engage and will be wedged between the inner and outer race surfaces 22 and 23 when the shaft 15 and inner race 18 are rotated in the clockwise direction as seen in Fig. 2, so that a drive will be provided in this direction of rotation to the shaft 16. When the shaft 15 tends to rotate in the opposite direction, the race 18 will tilt the sprags 24 in a clockwise direction against the spring action of the tabs 35 so as to release the sprags from wedging engagement with the race surfaces 22 and 23, and there will be no drive from the shaft 15 to the shaft 16. Assuming that the shaft 16 is driven by a prime mover, instead of the shaft 15, engagement of the sprags 24 with the races 18 and 21 will take place when the shaft 16 rotates in the counterclockwise direction as seen in Fig. 2 while a disengagement of the sprags 24 takes place if the rotation is in the opposite direction, as will be apparent. Either of the races 18 or 21 may also be anchored and held stationary by any suitable means if desired, and, in this case, rotation of the other race and its shaft is allowed by the sprags to take place in only one direction due to engagement of the sprags. The one-way engaging device in the latter cases functions as a brake instead of a clutch, as is apparent. The cage 31 and sprags 24 may be assembled in reversed position between the races 18 and 21 so that the sprags lean in the direction opposite from that in which they are shown in Fig. 2, and in this case, the one-way unit will function to drive in the opposite directions from those just mentioned, as is apparent.

With the cage 31 and sprags 24 disposed in operative relation between the inner and outer races 18 and 21, the cage 31 has the dual function of providing a spring engaging force for the sprags and also holds the sprags spaced with respect to each other, always out of contact with each other. In view of the fact that the surfaces 25 and 26 on the sprags are cylindrical, the sprags naturally tend to tilt between the races 18 and 21 about centers adjacent the centers 29 and 30 for the surfaces 25 and 26, such centers of tilt being approximately indicated by the points 40. The sprags actually tilt so that the portion of the surface 25 of each sprag between the points 25a and 25b contacts with the race 23 and the portion of the surface 26 between the points 26a and 26b contacts the race 18. The points 25a and 26a contact the races when the sprags are disengaged, and the points 25b and 26b contact the races when the sprags are engaged, and the sprags tilt between these extremes in the operation of the one-way unit. The tabs 35 exert a force indicated by the arrow 41 acting through a lever arm 42 effective as a turning moment on the sprags for tilting them under spring action, and, as will be noted, the sides of the sprags having the ledges 28 thereon do not contact the cage 31, so that the arm 42 is measured from the reaction vector 43 passing through the centers of the race surfaces 22 and 23 rather than from any reaction vector from the side of the window 34 opposite the tab 35. It will be noted that the cage 31 is located approximately the same distances from the surfaces 25 and 26 as are the centers 29 and 30 and passes approximately through the centers. The cage 31 therefore does not impede, substantially, the tilting movement of the sprags 24.

When the cage 31 and sprags 24 are disassembled from the remainder of the one-way device, the cage 31 holds the sprags from dropping out of it, and the ledge 28 on each of the sprags is provided for this purpose, namely, so that the sprags cannot slip through the windows 34. It will be noted that the ledges 27 and 28, with the adjacent sides of the sprags, respectively form grooves or slots 27a and 28a extending longitudinally of the sprags and that one side of the window 34 in which each sprag is positioned extends into the groove 28a and the opposite tab 35 extends into the groove 27a. The sprags and cage may thus be shipped and assembled between the races as a subassembly and unit.

The sprags may be assembled into the openings 34 simply by moving them from the inside of the cage 31 outwardly through the windows against the flexing and spring action of the tabs 35, and after the ledge 28 of each of the sprags has passed into the corresponding window 34, the adjacent tab 35 will return to its unflexed position in which the particular tab 35a in Fig. 2 is illustrated.

The embodiment of the invention illustrated in Figs. 4, 5, 6 and 7 is similar to the Fig. 1 embodiment in that a single member is used for both spacing the sprags from each other as well as for applying the spring engaging force for the sprags and differs from the first embodiment principally in that this member is of substantially lighter stock which does not take a permanent set in either its flat condition or in its circular condition when disposed between the sprag engaging surfaces. The embodiment illustrated in these figures comprises the inner race 18 having the cylindrical race surface 22 and the outer race 21 having the cylindrical race surface 23. Sprags 45 similar in general to the sprags 24 are disposed between the surfaces 22 and 23. A sprag retainer 46 of a ribbon of spring material, such as a metal, is provided for holding the sprags 45 spaced from each other and for urging them into engagement with the surfaces 22 and 23.

The sprags 45 are each provided with cylindrical race engaging surfaces 47 and 48. The cylindrical surfaces 47 and 48 are formed from parallel center lines passing respectively through points 49 and 50 and are so disposed that the sprags engage with and between the race surfaces 22 and 23 when the sprags are tilted in a counterclockwise direction as seen in Fig. 5. A slot 51 is formed on one side of each of the sprags 45 and a slot 52 is formed on the other side of the sprag with both of the slots extending longitudinally of the sprag as shown. It will be noted that the slot 51 is narrower than the slot 52, although approximately the same depth, and that the slot 52 is located closer to the surface 48 than is the slot 51, although both slots are generally intermediate the curved race engaging surfaces 47 and 48 as are the centers 49 and 50.

The sprag retaining member 46 is a ribbon of resilient sheet material, such as for example clock spring steel, cold rolled stainless steel or beryllium copper. The ribbon is of substantially less thickness than the cage 31 in the first embodiment of the invention, and is flexible such that it does not take a permanent set either in its flat form or when put into a generally circular configuration as it is illustrated in Fig. 5 in assembled position. The ribbon may be, for example, of .007 to .009 inch thick for clock spring and cold rolled stainless steel and may have a thickness of .012 to .015 inch for beryllium copper. The member 46 is provided with a series of windows 53 therein and a tab 54 extending into each of the windows. The windows are each bounded by edge portions 55 and transversely extending portions comprising the tab 54 and relatively narrow connecting portions 56.

The sprags 45 are each positioned in a window 53 with the rear edge 57 of the adjacent transversely extending portion disposed in the slot 51 and the adjacent tab 54 disposed in the slot 52. The sprags may be placed in the windows when the member 46 is out of position with respect to the races 18 and 21 and snapped into position against a flexing of the tabs 54 in particular as well as a torsional twist of the portions 56 until the tabs 54 rest in the slots 52. The sprags then are free within the windows so that there is no flexing of any of the portions of the member 46 due to the mere presence of the sprags in the windows.

The sprags 45 and ribbon 46 are assembled between the races 18 and 21 substantially as shown in Fig. 5 with the sprags being tilted clockwise against the spring action of the ribbon 46. The sprags each pivot about the adjacent edge 57 and the narrower slot 51 receiving this edge, and the tab 54 is sprung outwardly as shown. Since the ribbon 46 is rather resilient, the portions 56 bend torsionally, and there is some bending of the portions 55 also when the sprags are positioned between the races so that the tab 54, as well as the portions 56 and 55, provide a resilient engagement of the sprag surfaces 47 and 48 with the race surfaces 22 and 23.

The ribbon 46 has two ends 58 and 59 which are in overlapping condition when the ribbon and sprags are assembled between the races 18 and 21. The sprags 45 in assembled relation between the races 18 and 21 are rotated in the clockwise direction against the spring action of the ribbon 46, and hence the end 59 to the left of the adjacent sprag in the ribbon and the end 58 to the right of the adjacent sprag in the ribbon tend to be respectively moved outwardly and inwardly. The ribbon end 59 is therefore positioned inwardly with respect to the ribbon end 58 so that such movement of the ends 58 and 59 is restricted. It is thus not necessary to fasten these ribbon ends together, and the ribbon and sprag assembly may simply be allowed to lie loosely between the races 18 and 21.

The one-way engaging device illustrated in Figs. 4 to 7 operates substantially in the same manner as that shown in Figs. 1 to 3. It will be noted that, in this embodiment also, the unit spring and cage 46 held in position by the slots 51 and 52 in the sprags extends approximately across the centers 49 and 50 for the sprag surfaces 47 and 48 which are adjacent the centers of tilt of the sprags indicated approximately by the point 60, and hence the sprag retainer need not be moved as a whole relative to the sprags and thus restrict their movement on tilting of the sprags for engagement or disengagement of the one-way device. The sprags 45 in this embodiment have a portion of the surface 48 which is between the points 48a and 48b in contact with the cylindrical surface 23 and a portion of the surface 47 which is between the points 47b and 47a in contact with the cylindrical surface 22 during tilting of the sprags during operation. The points 47a and 48a are in contact with the surfaces when the sprags are fully disengaged; the points 47b and 48b are in contact with the surfaces in fully engaged positions of the sprags; and intermediate points on these surfaces 47 and 48 engage the races between fully engaged and fully disengaged positions of the sprags. During tilting movement of the sprags, the tabs 54 move within the wide, shallow grooves 52 and rest and move on the sides 52a of the grooves in particular. Since the grooves 52 are wide and shallow, the ends of the tabs 54 never are moved completely out of the grooves during the full tilting movement of the sprags from their fully engaged to their fully released positions. Since the groove 52 is located closer to the surface 48 than is the groove 51, the tabs 54 disposed in the grooves 52 are flexed outwardly as seen in Fig. 5 against the spring action of the tabs for all operative positions of the sprags between their fully engaged and fully released positions. The sprags pivot about the relatively narrow slot 51 in which the edges 57 of the windows 53 extend. The tabs 54 each provide a tilting force indicated by the arrow 61 which acts through a moment arm 62 measured between the arrow 61 and an arrow 63 extending from the adjacent edge 57 and indicating the reaction force. It will be noted that the moment arm 62 is greater than the moment arm 42 in the previous embodiment since tilting takes place about the slot 51 of each sprag, and this greater moment arm is needed in view of the fact that the cage 46 is of considerably thinner material and has less spring effect than the material of the cage 31 in the previous embodiment.

The embodiment of the invention illustrated in Figs. 8 and 9 is quite similar to that shown in Figs. 4, 5, 6 and 7 with the principal exception that the sheet metal ribbon sprag retainer is preliminarily formed so as to be yieldable longitudinally thereof, and tension is put on the sprag holder when in assembled relation between inner and outer races. This embodiment of the invention, like the embodiment shown in Figs. 4 to 7, comprises the inner and outer races 18 and 21 having the cylindrical race surfaces 22 and 23 and sprags 45 tiltably disposed between the races. A sheet metal ribbon sprag holder 65 having windows 53, tabs 54, transversely extending portions 56 and longitudinally extending portions 55 is provided for holding the sprags 45 spaced with respect to each other and applying a spring tilting force on the sprags. The sprag holder 65 differs from the sprag holder 46 in the previous embodiment in that the longitudinally extending portions 55 of the sprag holdere are formed of greater length in the original flat condition of the ribbon, and these portions are then bent into set condition with return bent portions 66 curved out of the plane of the ribbon so as to bring the end of each tab 54 as close to the adjacent edge 57 of the window as in the previous embodiment. The sprag holder 65 is provided with a window 67 on one end having the curved portions 66 but without any tab 54 and is provided with a window 68 on its other end with a tab 54 but without any curved portions 66.

The sprags 45 are assembled into the ribbon sprag holder 65 by snapping them into place in the same manner as they are assembled into the sprag holder 46 in the previous embodiment. The sprag-ribbon assembly is then inserted between the race surfaces 22 and 23 with the sprags 45 being tilted in the clockwise direction against the action of the tabs 54 in particular. The windows 67 and 68 are put about the same sprag 45a, and the ribbon is elongated against the spring action of the return bent portions 66 from its original length in assembling it in the one-way device, and the sprag 45a maintains tension in the sprag retainer 65. Due to this tension in the ribbon 65 in its assembled position, the ribbon 65 holds the sprags 45 with a greater force against the inner race surface 22 than against the surface 23 when the one-way device is disengaged. Assuming that when the one-way device shown in Figs. 8 and 9 is disengaged due to a rotation of the race 21 with the race 18 being stationary, the wear on the surfaces 48 of the sprags and on the race surface 23 is reduced as compared to the case in which no such tension is provided on the sprag retainer.

The embodiment of the invention illustrated in Figs. 10 and 11 is quite similar to that shown in Figs. 4 to 7 except that the ribbon is so formed initially, in its flat state, as to apply a greater tilting force on the sprags without increasing the thickness of the ribbon. The embodiment of the invention illustrated in Figs. 10 and 11 comprises a metal ribbon sprag holder 75 for holding the sprags 45 between the races 18 and 21 in the same manner as the sprag holder 46 in the previously described embodiment. The ribbon 75 is initially in the same form as the ribbon 46 in its flat state illustrated in Fig. 7. The tabs 54 in the ribbon are then bent and given a set so as to extend inwardly out of the plane of the ribbon substantially as shown in Fig. 11. Thus, when the sprags have been inserted into the windows 53 against the spring action of the tabs, the tabs when holding the sprags 45 in tilted engagement with the surfaces 22 and 23 exert a stronger spring action tending to engage the sprags than in the Figs. 4 to 7 embodiment, for example.

The embodiment of the invention illustrated in Figs. 12, 13 and 14 shows a sheet material sprag holder 80 which may be similar to the sprag holder 31 in the first embodiment of the invention except that the windows 34 are stamped into the sprag holder after the holder has been given an initial set so that it remains in the circular shape in which it is used between the races 18 and 21. The sprag retainer may simply be a section of a sheet metal tube which is unitary and unsplit and the sprag retainer 80 is illustrated in this condition. The tabs 35 instead of extending in the free condition of the sprag holder slightly out of the circular configuration of the sprag holder as a whole, as is illustrated by the tab 35a in Fig. 2, lie in the same cylindrical surface as does the sprag holder as a whole, and the tabs 35 thus exert a stronger spring force tending to engage the sprags 24 when the sprag retainer is assembled in the one-way device.

The advantages of my invention are numerous. In each of the forms of the invention the unit cage and spring has three important functions. The cages are of yieldable material and tilt the sprags by spring force into engagement with the inner and outer races of the one-way engaging device; the cages hold the sprags in spaced relation from each other when the sprags and sprag retainer are assembled between the races; and the sprag retainer holds the sprags from falling out of the retainer when the sprags and retainer are disassembled from the remainder of the one-way device so that the sprags and retainer may be used as a single assembly both in shipping and in assembly of the one-way device. Due to the fact that the sprags and sprag retainer are a single assembly, the one-way devices may be easily assembled and disassembled. In view of the fact that the sprag retainers are only a single piece for performing all of the three above mentioned functions, and no additional cages or separators for the sprags are needed, my one-way devices are of economical construction and include a minimum number of parts. In each of the forms of my invention, the sprags are simply snapped in position in the sprag retainers against the resilience of the retainers, and the sprags are thus easily assembled in the retainers. In each of the forms of the invention, no openings through the sprags are required, either between the ends of the sprags or at their ends, and there is thus no expensive hole drilling operations for the sprags required and no resultant weakening of the sprags with less than the complete race engaging surfaces of the sprags engaging the races with yielding in the sprags in the region of any holes therethrough. Ledges or grooves extending for the full length of each of the sprags are provided for holding the sprags within the sprag retainers, and these may economically be formed in the sprags by simply drawing the sprags as long lengths of wire with the grooves drawn therein which are severed into short lengths to form the individual sprags.

Each of the sprag retainers is effective on the sprags approximately mid-way between the race engaging surfaces of the sprags in the regions of the sprags about which they naturally pivot and tilt due to their cylindrical race engaging surfaces so that substantial movement of the retainer in one direction or the other relative to the sprags to allow engagement and disengagement of the sprags with the races does not take place. Due to the inertia of the sprag retainer, if such movement of the retainer were necessary for engagement of the sprags, the retainer would impede the engagement of the sprags. However, the sprag retainers in my constructions constitute only a single member, are advantageously light and have little inertia, and this is particularly true in the forms of the invention shown in Figs. 4 to 11. Since the retainer is approximately mid-way between the races and the race engaging surfaces of the sprags, transversely extending cross portions of the retainer do not limit tilting of the sprags. The fact that the sprag retainer is located approximately mid-way between the races also allows a maximum of sprag receiving windows to be formed in the sprag retainer and a maximum number of sprags to be placed between the races resulting in a maximum power capacity of the one-way device.

Since my invention comprises a sprag retainer having a series of windows formed therein for receiving the sprags; if desired, certain of the sprags may be allowed to remain out of their windows for decreasing the capacity of the one-way device without the necessity of providing a completely new sprag retainer. In each of the forms of the invention, the sprags pivot about axes which are parallel to the axes of the races, and there is no cocking of the sprags out of alignment or out of parallel with the axes of the races or with the axes of the other sprags, and in the embodiments of the invention shown in Figs. 4 to 11, the pivoting of the sprags takes place about an edge of the transversely extending cross portions of the sprag retainer which are parallel to the axes of the races and hold the sprags in positions parallel to the axes of the races. In each of the embodiments of the invention, the inherent resilience of the sprag retainer is utilized for tilting the sprags into engagement with the races, and thus no circular spring under tension passing through the sprags is required for this function which would have the tendency to come apart at its ends and thus cause trouble.

The flexible metal ribbon sprag retainer illustrated in Figs. 4 to 11 advantageously allows the sprag retainer and sprag assembly to be used with races of many diameters. It is only necessary to cut off of a length of perforated sheet metal ribbon, such as is illustrated in Fig. 7, for example, a less or greater length to substantially completely fill with sprags the space between the inner and outer races of the particular one-way engaging device to be built. Many different sizes of one-way engaging devices may thus be made utilizing only this single metal ribbon sprag retainer which is used in a less or greater length, and this flexible retainer thus has the advantage of providing economy in the manufacture of one-way engaging devices of a number of sizes.

The form of the invention illustrated in Figs. 8 and 9 advantageously provides a spring force on the sprags holding them in greater pressure of contact with the inner race than with the outer race, so that if the one-way engaging device is used in a case in which the sprags tend to be stationary with respect to the inner race when the outer race is rotating in a direction to disengage the sprags, the wear on the sprags will be at a minimum. It will of course be apparent that the sprag retainer illustrated in Fig. 9 may instead be compressed in assembling it into position with the sprags between the inner and outer races, instead of expanding it, so that the sprags will be forced with greater pressure against the outer race rather than against the inner race, and, if conditions are such that the sprags tend to rotate with the outer race, they will do so and the wear on the sprags in this case also will be reduced to a minimum.

The tilting force on the sprags from the sprag retainer may be changed as illustrated by the forms of the invention shown in Figs. 10 to 14 by prebending the tabs effective on the sprags prior to assembly of the sprags and retainer between the races. In the embodiment shown in Figs. 10 and 11, the tabs 54 are preliminarily bent inwardly so that when finally assembled between the races with the sprags extending through the windows 53, the tabs are bent in the opposite direction and exert a greater yielding force on the sprags tilting them into engagement with the inner and outer races. In the embodiment of the invention illustrated in Figs. 12 to 14, the tabs 35 are in the same circular surface as is the rest of the retainer 80 when the retainer is disassembled from the rest of the assembly, since the retainer 80 is in the form of a solid tube and the windows 34 are punched in the retainer while in its tubular form. The force exerted by the tabs on sprags extending through the windows in this embodiment is greater than the tilting force obtained from the tabs 35 in the embodiment of the invention illustrated in Figs. 1 to 3, since in the latter form of the invention, the tabs and windows are formed in a flat strip of retainer prior to the retainer being put into its round form, with the tabs, as illustrated by the tab 35a, extending outwardly at a slight angle with respect to the surface of the retainer as a whole. The tabs 35 in the embodiment shown in Figs. 12 to 14 are thus bent outwardly farther from their free position when assembled with the sprags between the races than are the tabs 35 in the embodiment shown in Figs. 1 to 3.

I wish it to be understood that my invention is not to be limited to the specific constructions and arrangements shown and described except only insofar as the claims may be so limited, as it will be apparent to those skilled in the art that changes may be made without departing from the principles of the invention.

I claim:

1. In a one-way engaging device, two opposed races, a series of wedge elements interposed between said races and adapted to wedge between the races, and a cage of resilient sheet material having means defining a series of openings therein for receiving said wedge elements, said opening defining means including means engaging said wedge elements, and resilient portions of the cage adjacent said wedge element engaging means being effective to bias said wedge elements into wedging engagement with said races.

2. In a one-way engaging device, two opposed races, a series of wedge elements interposed between said races and adapted to wedge between the races, and a cage member for said wedge elements comprising a strip of resilient material having means defining a series of openings therein for receiving said elements, said opening defining means including resilient cross portions in contact with said wedge elements for holding the elements spaced from each other and the cross portions being adapted and arranged, due to the resilience thereof, to urge the wedge elements into wedging engagement with said races.

3. In a one-way engaging device, two opposed races, a series of wedge elements interposed between said races and adapted to wedge between the races, and a cage member of a resilient metal strip having means defining openings therein for receiving said elements, and said cage including other means defining a plurality of integral spring tabs respectively disposed in contact with each of said elements for urging the elements into wedging engagement with said races.

4. In a one-way engaging device, inner and outer coaxial races, a series of tiltable sprags interposed between said races and adapted to be tilted to wedge between the races, and a cage of a resilient metal strip having means defining openings for receiving said sprags, said cage also including means defining a plurality of integral spring tabs respectively extending into each of said openings, and each of said sprags having means defining a slot therein, said tabs being disposed in the slots in the respective sprags and thereby engaging the sprags for urging the sprags into wedging engagement with said races under the spring action of the tabs.

5. In a one-way engaging device, two opposed races, a series of tiltable sprags interposed between said races and adapted to wedge between the races, and a sprag energizing member of a resilient material ribbon having means defining openings therethrough for receiving said sprags, said energizing member having means respectively providing an integral resilient tab extending into each of said openings, and means on said sprags defining slots on opposite sides thereof, said sprags being disposed in said openings with the respective tabs being positioned in one of said slots of each sprag and in engagement with the sprag and the other slot in each sprag receiving the side of the opening opposite the tab whereby the resilient tabs tilt the sprags into engagement with the races.

6. In a one-way engaging device, two opposed races, a series of tiltable sprags interposed between said races and adapted to wedge between the races, and a sprag energizer of a resilient material strip having means defining openings therethrough for receiving said sprags, means on said sprags defining slots in opposite faces thereof for receiving opposed edges of said openings, said opposed edges of said openings being adapted and arranged to engage said opposite faces of said sprags for holding the sprags fixed in said energizer, said energizer including resilient portions adjacent said opposed edges of said openings for urging said sprags to tilt to engage the races.

7. In a one-way engaging device, two opposed races, a series of tiltable sprags interposed between said races and adapted to wedge between the races, and a sprag energizing member of a resilient material having means defining openings therethrough for receiving said sprags, each of said sprags including means defining slots in opposite sides thereof adapted to receive respectively opposite sides of the respective opening defining means, opposed opening defining means being adapted to engage said opposite sides of said sprags, said energizing member including resilient portions adjacent said opening defining means effective to tilt the sprags about a first one of said slots and resiliently bias the sprags into engagement with the races, the second one of said slots in each of the sprags having a slanted bearing portion on which the cooperating portion of said opening defining means slides as the sprag tilts about the portion of said opening defining means in the first slot whereby the portion of the opening defining means in said second slot remains in the second slot in engagement with the sprag.

8. In a one-way engaging device, two opposed races, a series of tiltable sprags interposed between said races and adapted to wedge between the races, and a sprag receiving member of a resilient material having means defining openings therethrough for receiving said sprags, said receiving member including means respectively defining a resilient tab extending into each of said openings, said sprags each having means defining slots in opposite sides thereof, each sprag being respectively disposed in one of said openings with one of the slots in each sprag having a portion of said opening defining means disposed therein, said tabs respectively extending into the opposite slot in each of the sprags and engaging the means defining the opposite slot therein, whereby the resilient tabs are effective to apply a force to said tiltable sprags for urging the sprags into engagement with the races.

9. In a one-way engaging device, inner and outer coaxial cylindrical races, a series of tiltable sprags interposed between said races for engaging the races on tilting thereof, and a sprag energizing member of a resilient metal ribbon including means defining openings therethrough for receiving the sprags, portions of said opening defining means being disposed in engagement with said sprags, said resilient metal ribbon sprag energizing member including resilient portions adjacent said opening defining means for acting on said sprag engaging portions to bias the sprags into engagement with the races.

10. In a one-way engaging device, inner and outer coaxial cylindrical races, a series of tiltable sprags interposed between said races and each having wedging surfaces on opposite sides thereof adapted to engage the races on tilting of the sprags and a sprag energizing member of a resilient metal ribbon including means defining openings therethrough for receiving said sprags, said energizing member including means defining resilient tabs respectively extending into each of said openings, each of said sprags being respectively disposed in said openings with opposed sides of said sprags respectively adapted to engage said resilient tabs and the respective sides of said openings opposite said tabs, whereby said resilient tabs are effective to exert a tilting bias on said sprags tending to urge them into wedging engagement with the races.

11. In a one-way engaging device, inner and outer coaxial cylindrical races, a series of tiltable sprags interposed between said races and adapted to be tilted to wedge between the races, and a sprag energizing member of a resilient metal strip having means defining openings therein for receiving said sprags, portions of said opening defining means being adapted to contact the sides of said sprags said resilient metal strip sprag energizing said member including means defining a plurality of reverse bent portions longitudinally of its length, and said resilient metal strip sprag energizing member further including resilient portions adjacent said opening defining means effective to apply a force on the sprags for wedging them between the races.

12. In a one-way engaging device, inner and outer coaxial cylindrical races, a series of tiltable sprags interposed between said races and adapted to be tilted to wedge between the races, and a sprag energizing member of a resilient metal ribbon including means defining openings therein for receiving said sprays, portions of said opening defining means being adapted to contact the sides of said sprags, said resilient ribbon including means defining a plurality of return bent portions longitudinally of its length, and said resilient metal ribbon further including means defining a plurality of integral resilient tabs respectively extending into each of said openings and adapted to respectively engage the sprags and apply a tilting force on the sprags for wedging them between the races.

13. In a one-way engaging device, two opposed races, a series of tiltable sprags interposed between said races and adapted to be tilted to wedge between the races, and a cage of resilient metal for said sprags for holding the sprags spaced from each other and having a tab engaging each of the sprags and urging the sprags by spring action into wedging engagement with the races, said cage being a continuous tube of resilient sheet metal having a series of openings therein each for receiving one of the sprags.

14. In a sprag and cage assembly for a one-way engaging device, the combination of a resilient sheet metal cage including means defining a series of openings therein, a plurality of sprags adapted to be tilted to engage between two opposed races of the one-way device and respectively positioned in said openings in engagement with certain portions of said opening defining means, and said cage including means defining resilient portions adjacent said opening defining means and effective to tilt said sprags in a race engaging direction.

15. In a sprag and cage assembly for a one-way engaging device, the combination of a resilient sheet metal cage having means defining a series of openings therein, said cage including integral resilient tabs respectively extending into each of said openings, and a plurality of sprags adapted to be tilted to engage between two opposed races of the one-way device respectively positioned in said openings, each of said sprags having means defining an indentation therein engaged by the adjacent resilient tab, whereby each of said tabs may urge the adjacent sprag under spring action to tilt in a race engaging direction.

16. In a sprag and cage assembly for a one-way engaging device, the combination of a circular metal cage having a series of openings therein and a sprag adapted to be tilted to engage between two opposed races of the one-way device positioned in each of said openings, said cage having a tab extending into each of the openings and said sprags each having recesses on opposite sides receiving a side of the opening in one recess and the tab in the other recess and being held thereby from falling out of the opening, said cage being of resilient sheet metal whereby the tabs may urge said sprags to tilt in a race engaging direction under spring action by the tabs but being of sufficient thickness to take a set and retain its circular form with the sprags disposed therein.

17. In a sprag and cage assembly for a one-way engaging device, the combination of a cage comprising a length of resilient metal strip having means defining a series of openings therein, and sprags adapted to be tilted to engage between two opposed races of the one-way device positioned in said openings in engagement with said opening defining means, said cage being adapted and arranged to take no substantial set so that the sprag and cage assembly may be utilized between races of many different diameters.

18. In a sprag and cage assembly for a one-way engaging device, the combination of a cage comprising a length of resilient metal strip having means defining a series of openings therein and sprags positioned in said openings adapted to be tilted to engage between two opposed races of the one-way device and said sprags having means defining slots in opposite sides thereof said slot defining means being adapted to engage said opening defining means so as to hold said sprags from coming out of the openings of the cage, said cage being adapted to take no substantial set so that the assembly may be used between races of many different diameters.

19. In a sprag and cage assembly for a one-way engaging device, the combination of a cage comprising a length of resilient sheet metal ribbon having means defining a series of openings therein and sprags adapted to be tilted to engage between two opposed races of the one-way device positioned in said openings, said cage including means defining resilient tabs respectively extending into each of said openings, said sprags including means defining slots on opposite sides thereof, one of which receives a portion of the means defining the opening in which the sprag is positioned and the other of which receives the tab extending into the opening, said cage being adapted and arranged to take no substantial set with the sprags in said openings so that the assembly may be used with races of many different diameters and so that said sprags may be snapped into position in said openings against the resilience of the tabs and the resilient tabs operate to tilt the sprags in a race engaging direction.

20. In a sprag and cage assembly for a one-way engaging device, the combination of a cage of a resilient sheet metal ribbon having means defining a series of openings therein and including means defining a plurality of resilient tabs respectively extending into said openings, and sprags each having eccentric cylindrical surfaces on opposite sides thereof adapted to engage between two opposed races of the one-way device upon tilting of the sprags, said sprags being positioned in said cage openings, said sprags including means defining slots on other opposite sides thereof one of which receives a portion of the means defining the opening in which the sprag is positioned and the other of which receives the tab extending into the opening, said cage being adapted and arranged to take no substantial set whereby said resilient tabs tend to tilt said sprags in a race engaging direction and the assembly may be used between races of many different diameters.

21. In a sprag and cage assembly for a one-way engaging device, the combination of a cage of resilient material having means defining a series of openings therein, and a plurality of sprags adapted to be tilted to engage between two opposed cylindrical races of the one-way device, said sprags being respectively positioned in said openings and having opposite curved race engaging surfaces on opposite sides thereof and having means defining slots on other opposite sides thereof, each of said sprag slots receiving a portion of the means defining the opening in which the sprag is positioned, and one of said slots being located closer to one of the race engaging surfaces of each sprag than is the other whereby the resilient material cage is effective to exert a tilting force on each sprag in a race engaging direction.

22. In a sprag and cage assembly for a one-way engaging device, the combination of a cage of resilient material having means defining a series of openings therein, and a plurality of sprags adapted to be tilted to engage between two opposed cylindrical races of the one-way device, said sprags being respectively positioned in said openings and having two curved race engaging surfaces on opposite sides thereof and also having means defining two slots on still other opposite sides thereof, said cage including means defining a plurality of resilient tabs respectively extending into each of said openings, a first one of said slots being located closer to one of said curved surfaces in each of said sprags than is the other slot and having a slanted bearing surface, said first slot in each sprag being adapted to receive the resilient tab which extends into the cage opening in which the sprag is received and the resilient tab being adapted to bear and move on said bearing surface as the sprag pivots about the portion of the opening defining means opposite to said tab and disposed in the other slot, whereby said tabs are respectively effective to urge the sprags to tilt in a race engaging direction.

23. In a sprag and cage assembly for a one-way engaging device, the combination of a cage of resilient sheet metal ribbon having means defining a series of openings therein and a plurality of sprags adapted to be tilted to engage between two opposed races of the one-way device respectively positioned in said openings, said means defining said openings including means engaging said sprags when said sprags are positioned in said openings, said cage being adapted and arranged to take no substantial set and being effective to urge the sprags to tilt in a race engaging direction, said cage having means defining a plurality of return bent portions longitudinally of its length providing additional longitudinal resilience in said resilient sheet metal cage.

24. In a sprag and cage assembly for a one-way engaging device, the combination of a cage having a series of openings therein and a sprag adapted to be tilted to engage between two opposed races of the one-way device positioned in each of said openings, said cage having a tab extending into each of the openings and said sprags each having slots on opposite sides thereof one for receiving an edge of an opening and the other for receiving the tab extending into the opening, said cage being of a resilient sheet metal ribbon taking no substantial set with said sprags assembled therein and said tabs being adapted to tilt said sprags in a race engaging direction by spring action of the tabs, said tabs when said ribbon is disposed substantially flat being bent out of the plane of the ribbon for exerting a changed tilting force on the sprags.

25. A sprag for a one-way engaging device adapted to be tilted to engage between two opposite cylindrical surfaces of the device comprising a body formed with two cylindrical surfaces on opposite sides thereof adapted to engage the cylindrical races and other opposite sides thereof each comprising a pair of offset substantially flat surfaces joined together by a ledge, one of the ledges facing one of said cylindrical race engaging surfaces and the other facing the other cylindrical engaging surface.

26. A cage adapted to tilt a wedging device into wedging engagement with a pair of races comprising a strip of resilient sheet material having means defining an opening therein adapted to receive the wedging device and having resilient portions adjacent said opening defining means, said opening defining means being adapted to engage the wedging device and bias it into wedging engagement with the races due to the resilience of said portions adjacent said opening defining means.

27. A cage adapted to tilt a wedging device into wedging engagement with a pair of races comprising a strip of resilient sheet material having means defining an opening therein adapted to receive said wedging device, said opening defining means defining a resilient tab integral with said strip extending into said opening and adapted to engage and resiliently bias the wedging device into wedging engagement with the races.

28. A cage adapted to peripherally space and bias a plurality of tiltable grippers into wedging engagement with a pair of concentric races comprising a flexible sheet metal member having a permanent cylindrical set and adapted to be disposed concentrically between the races, said member having a plurality of peripherally spaced openings for receiving the grippers between opposed sides of the openings, one of the opposed sides of each of said openings defining a tab extending respectively into the openings, and the tabs and the sides of the openings opposite the tabs being adapted to engage opposite sides of the grippers, said tabs being effective to bias the grippers, due to the resilience thereof, into wedging engagement with the races when the grippers and member are disposed between the races.

29. A cage adapted to tilt a plurality of sprags into wedging engagement with a pair of races comprising a strip of resilient sheet material having a plurality of openings therein each defined by two opposed sides comprising longitudinally extending portions of the strip and by two other opposed sides comprising the edges of cross portions of the strip, each of said longitudinally extending portions of the strip defining a return bent portion for providing additional longitudinal resilience in the strip, said strip being adapted to receive a sprag in each of said openings whereby the resilience of the strip is effective to bias the sprags into wedging engagement with the races.

30. A cage adapted to tilt a plurality of grippers into wedging engagement with a pair of races comprising a strip of flexible sheet metal having a plurality of openings therein and having longitudinally spaced transversely extending wrinkles corresponding respectively to each of the openings, said strip including means defining an integral tab extending respectively into each of said openings, and said strip being adapted to receive a gripper in each of said openings whereby the resilience of the tabs and strip is effective to bias the grippers into wedging engagement with the races when the grippers and strip are disposed between the races.

31. A cage adapted to tilt a plurality of grippers into wedging engagement with a pair of races comprising a strip of flexible material having a plurality of openings therein adapted to receive the grippers, said strip defining a plurality of tabs extending respectively into each of said openings, each of said tabs being bent out of the plane of said strip, said tabs being adapted to engage the grippers when they are positioned in the openings and bias the grippers into wedging engagement with the races.

References Cited in the file of this patent

UNITED STATES PATENTS

| 2,383,595 | Dodge | Aug. 28, 1945 |
| 2,388,424 | Lund | Nov. 6, 1945 |
| 2,428,962 | Davis | Oct. 14, 1947 |
| 2,624,436 | Gamble | Jan. 6, 1953 |

FOREIGN PATENTS

| 298,673 | Great Britain | Oct. 15, 1928 |
| 614,774 | Great Britain | Dec. 22, 1948 |